United States Patent
Todd

[19]

[11] Patent Number: 6,072,393
[45] Date of Patent: Jun. 6, 2000

[54] ANTI-THEFT ALARM FOR PORTABLE ELECTRICALLY OPERATED DEVICES

[75] Inventor: John M. Todd, Toronto, Canada

[73] Assignee: Micro Snitch Corporation, Waterloo, Canada

[21] Appl. No.: 09/215,230

[22] Filed: Dec. 18, 1998

Related U.S. Application Data

[60] Provisional application No. 60/068,299, Dec. 19, 1997.

[51] Int. Cl.[7] .................................................. G08B 13/14
[52] U.S. Cl. .................. 340/568.2; 340/571; 340/572.1; 340/568.1
[58] Field of Search ................................ 340/571, 568.2, 340/572.1, 686.1, 868.1; 70/57.1

[56] References Cited

U.S. PATENT DOCUMENTS

| | | | |
|---|---|---|---|
| 4,327,360 | 4/1982 | Brown | 340/571 |
| 4,385,288 | 5/1983 | Bitko | 340/571 |
| 4,654,640 | 3/1987 | Carll et al. | 340/568.2 |
| 4,686,514 | 8/1987 | Liptak, Jr. et al. | 340/571 |
| 4,908,608 | 3/1990 | Reinke et al. | 340/571 |
| 5,317,304 | 5/1994 | Choi | 340/571 |
| 5,434,559 | 7/1995 | Smiley et al. | 340/571 |
| 5,574,430 | 11/1996 | Ott et al. | 340/568.2 |
| 5,675,321 | 10/1997 | McBride | 340/568.2 |
| 5,748,083 | 5/1998 | Rietkerk | 340/568.2 |
| 5,910,768 | 6/1999 | Ott | 340/568.2 |

*Primary Examiner*—Benjamin C. Lee
*Attorney, Agent, or Firm*—Barrigar & Moss

[57] ABSTRACT

An anti-theft alarm is provided, for a portable device such as a laptop computer. An embodiment of the anti-theft alarm comprises three main components: a uniquely coded tag for attachment to the bottom of the device, a pad upon which the device is placed, for sensing the tag, and an electrically powered control module. The module is connected to the pad. The control module is able to determine if the tag is still in contact with the pad—if not an alarm sounds immediately. The module can also determine if the electrical power has been disconnected and if the module has been moved (using a motion sensor). If there is no power and the module has been moved, an alarm sounds immediately. The alarm can be disabled with a key switch.

2 Claims, 1 Drawing Sheet

ANTI-THEFT ALARM FOR PORTABLE ELECTRICALLY OPERATED DEVICES

This application claims the benefit of U.S. Provisional Appln. No. 60/068,299 filed Dec. 19, 1997.

TECHNICAL FIELD

The present invention relates to an anti-theft device for portable devices powered by external or internal electrical power sources. It is particularly useful for the protection of portable computers, e.g. laptops, VCR's and the like which are easily portable.

BACKGROUND TO THE INVENTION

In the past few years computers have become commonplace in commerce, in industry and in the home. As the amount of storage and computing capacity goes up, the more valuable are the computers, their component parts, the software stored on them and the information contained on disk, tape or optical storage devices. Smaller components have permitted the development of portable computers, e.g. laptops and notebooks. While original equipment manufacturers and software manufacturers have concentrated on developing password systems and other security devices to prevent unauthorized access to information on the computer, very little has been done to physically protect the computers themselves, apart from providing physical tethers. Even these are little deterrent to thieves, who are often equipped with cable cutters.

Protection is particularly difficult for laptop computers and the like, which are intended to be easily portable. The most vulnerable time for theft of laptop computers is when they are left on a user's desk or the like. When being transported, they are usually out of view, in a suitcase or car trunk, or are carried by hand, and therefore less likely to be stolen. Although large numbers of thefts of computers, laptops and components are reported to police and company security personnel, there is little chance of recovery.

It is costly to replace stolen computers. Perhaps more importantly though, considerable loss of time and resources occurs as a result of having to reconstitute lost information. This is particularly so for businesses, which rely heavily on computerized information and transactions. Also, all information stored in memory, e.g. on hard disk is also stolen, thus compromising security of information. Preventing theft of portable computers and the like is very important for businesses, and increasingly for business and other people who travel with portable computers. In high traffic area such as hospitals, and in poorly guarded areas (most small businesses) computers are easily targeted and stolen. Laptops left on a desk are particularly vulnerable.

Attempts have been made in the past to provide anti-theft devices for televisions, computers and the like. For example, U.S. Pat. No. 4,908,608 which issued Mar. 13, 1990 discloses electrical equipment with a security device which is controlled by a microprocessor. The microprocessor produces a warning from a warning device when the electrical power is lost and/or the equipment is moved. The device has an interface which requires a password and which also allows battery checks, alarm tests and alarm arming sequences to be passed between the equipment and the security device. The security device is mounted inside the computer, with the circuitry on a card installed in a so-called expansion slot in the computer. U.S. Pat. No. 5,317,304 which issued May 31, 1994 to A. Choi shows a battery-operated device which is used to trigger an alarm. The battery may be recharged. There may be an anti-tamper switch which senses when the device's housing is being removed. The alarm must be programmed for delay before triggering, and for loudness and duration. It has a disarming key. The device may be external to a computer or internal, mounted in an expansion slot. The device requires a key pad which is used to set various control parameters, such as alarm loudness, and provides a password protection and alarm disarming function. U.S. Pat. No. 4,686,514 which issued Aug. 11, 1987 discloses an electrically operated alarm which has a motion sensing switch, and an anti-tamper switch to detect opening of a computer case. None of the alarms are entirely satisfactory. The present invention is intended to provide an improved alarm, particularly for portable electrically operated devices.

DISCLOSURE OF INVENTION

Accordingly the present invention provides an anti-theft alarm for a device having an underside, said anti-theft alarm comprising:

a) an electronically coded tag for attachment to the underside of the device, b) a sensing means for placement adjacent to the coded tag and for sensing the code on the tag, c) an electrically operated control module connectable to the sensing means and to an electrical power supply, said control module having i) a recognition sensor for recognizing a predetermined code on the coded tag, ii) a motion detector, iii) a tamper sensor for determining a condition selected from the group consisting of a first condition which consists of lack of recognition of the coded tag and a second condition which consists of disconnection of the electrical power together with movement of the control module as detected by the motion sensor, iii) an alarm which may be initiated by the tamper sensor under conditions of the first or second conditions, and an arming latch to keep the alarm activated while the first or second condition persists, and iv) deactivation means for deactivating the alarm or the tamper sensor.

In one embodiment, the sensing means is a moveable pad for placement on a flat horizontal surface with means for sensing the coded tag.

In another embodiment, the tamper sensor has warning means for giving a preliminary warning before setting off the alarm.

In a further embodiment, the warning means is selected from the group consisting of a warning light, a means for providing an audible warning.

In yet another embodiment, the deactivation means is a lockable key switch.

Another aspect of the invention provides an anti-theft alarm for a device, said anti-theft alarm comprising:

a) a first unique mechanical element for attachment to the device, b) a second mechanical element for cooperating with said first mechanical element, c) an electrically operated control module connectable to the second mechanical element and to an electrical power supply, said control module having i) a recognition sensor for recognizing cooperation of the first and second mechanical elements, ii) a motion detector, iii) a tamper sensor for determining a condition selected from the group consisting of a first condition which consists of lack of recognition of the cooperation of the first and second mechanical elements and a second condition which consists of disconnection of the electrical power together with movement of the control module as detected by the motion sensor, iii) an alarm which may be initiated by the tamper sensor under conditions of the first or second conditions, and an arming latch to keep the alarm activated while the first or second condition persists, and iv) deactivation means for deactivating the alarm or the tamper sensor. The alarm may be an analogue device or a digital device.

DETAILED DESCRIPTION OF PREFERRED EMBODIMENTS

Figure 1:
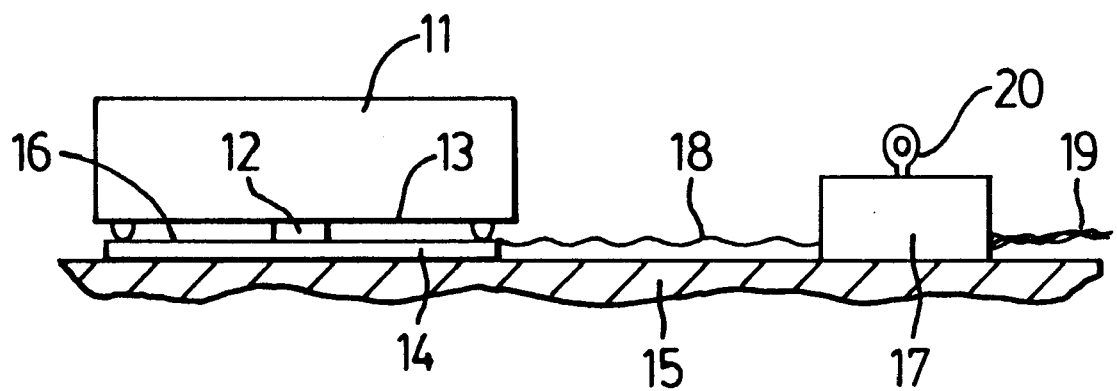
FIG. 1 is a diagram showing a laptop computer attached to the anti-theft alarm of the present invention.

FIG. 1 is a diagram which shows a laptop computer 11 with a coded tag 12 on the underside 13 of the laptop computer. The laptop computer 11 rests on a moveable pad 14, which in turn is resting on a flat horizontal surface such as a desk 15. The moveable pad 14 has at least part of its top surface 16 in contact with the coded tag 12. The moveable pad 14 is connected to control module 17 by electrical connection 18. Control module 17 is connected to an AC mains power supply (not shown by electrical wires 19. Control module has a key switch 20 for deactivating the control module alarm.

The coded tag 12 is uniquely coded for a particular laptop computer 11. The recognition sensor in the control module is programmed to recognize the unique code on the coded tag.

The control module 17 has an internal rechargeable battery and circuitry to permit sensing of the coded tag and for activation of an alarm device, and preferably a warning device, without being connected to the mains electrical power supply.

The control module 17 allows a tamper sensor to monitor the recognition sensor and determine if the tag, and therefore the laptop computer 11 is still on the moveable pad 14. If it is not on the pad 14, then the tamper sensor preferably initiates a warning device. The warning device, e.g. a warning voice or low level buzzer, alerts the user that the alarm will activate unless the laptop 11 with the uniquely coded tag 12 is not replaced on the pad 14. After a predetermined time interval, e.g. 30 seconds, if the laptop is not returned, an alarm is set off. If wire 18 is cut, then of course, the recognition sensor is unable to sense the coded tag, and the alarm will be set off. An arming latch keeps the warning means, and the alarm if triggered, activated. The only way to deactivate triggering of the warning or the alarm is to disarm the control module 17 with a key switch 20.

The control module 17 also has a motion detector therein. In the event that there is no electrical power from the mains supply and the control module is moved, then the tamper sensor detects the motion from the motion sensor and the warning device is activated. If there is still no electrical power after a predetermined time then the alarm activates. An arming latch keeps the warning means, and the alarm if triggered, activated. However, if the electrical power is restored, then the alarm is averted. The control module 17 may be moved after disconnection from the electrical power supply, without triggering the warning or the alarm by disarming the control module 17 with the key switch 20.

The control module has a DC power supply connected to a circuit for recharging the battery, and the DC supply is dependent on the external power supply.

The motion sensor may be a mercury switch or other motion detecting device. The preferred motion sensor is a tip switch. If the power is off then the alarm is armed, and if the motion sensor then detects motion, the alarm is set off as described before.

It will be understood that when there is electrical power available, it is possible to activate the motion sensor without the alarm being activated. When there is no external power to the present alarm, the battery is the sole electrical source. In this condition, if the motion sensor is tipped and thus activated, the arming latch ensures that power is continuously sent to the warning device, e.g. a speaker or buzzer. If AC power is turned back on, then the alarm returns to its quiescent state.

Preferably the alarm has circuitry or switching which permits modifying the volume of the alarm and the time it takes between activation of the motion sensor and activation of the alarm, e.g. allowing a warning to be sounded first. For example in a hospital environment it may be desirable to give an early warning of activation of the alarm, in the event that the alarm is accidentally triggered. This may be accomplished by giving a 30, 60 or 120 second delay before the alarm is set off. In addition, or alternatively, the alarm may be set off at low volume to begin with, but after a short time, e.g. 30 or 60 seconds the alarm is set off at full volume. Such conditions may be pre-set in the factory or may be settable on site by means of switches. Suitable means for controlling the time delays include capacitors and programmable interrupter circuits (PICs).

Of course, legitimate movement of the computer is desirable. A key lock 20 is provided to electrically disarm the alarm.

The control module may have an anti-tamper switch therein, to prevent a thief from attempting to disarm the alarm by breaking into the control module. It is preferred that the key lock perform both an electrical or electronic function to disarm the alarm and also a mechanical function with respect to the tamper switch. With respect to the tamper switch, the key lock preferably is located in a box which also covers the tamper device.

In the event of the presence of a tamper switch, In the event that the tamper device, e.g. tamper screw or membrane switch, is activated, then the audible alarm is set off, whether the power is connected or not. The audible alarm or the motion sensor can be disarmed by means of a key switch. An arrangement for the anti-tamper switch is shown in copending patent application No. 08/694525 which was filed Aug. 9, 1996, the disclosure of which is hereby incorporated by reference. An equivalent published application is Canadian Application No. 2 183 013.

The control module may have two or more pads attached thereto. For example, if a user has a main desk and a side desk, both of which the user sits at from time to time, the main desk and the side desk may each have a pad thereon, so that the laptop may be moved from one to the other without also having to transfer the pad. The pads may be permanently attached to the control module or may have plugs similar to telephone jacks.

It is preferable that the line (AC) power be direct to the control module and that there be a transformer in the control module to provide the low voltage DC power. However, it will be understood that the control module could be powered by DC power direct from a transformer plugged into a wall socket of line power. Another alternative is for the control module to be an AC powered device.

It will be understood that the electronic matching of the pad and the device could be replaced by a mechanical matching device. Such matching device may be a key system or similar.

I claim:

1. An anti-theft alarm for a device having an underside, said anti-theft alarm comprising:
   a) an electronically coded tag for attachment to the underside of the device,
   b) a sensing means for placement adjacent to the coded tag and for sensing the code on the tag,
   c) an electrically operated control module connectable to the sensing means and to an electrical power supply,
   said control module having i) a recognition sensor for recognizing a predetermined code on the coded tag, ii) a motion detector, iii) a tamper sensor for determining a condition selected from the group consisting of a first condition which consists of lack of recognition of the coded tag and a second condition which consists of disconnection of the electrical power together with movement of the control module as detected by the motion sensor, iv) an alarm which is initiated by the tamper sensor under conditions of the first or second conditions, and an arming latch to keep the alarm activated while the first or second condition persists, and v) deactivation means for deactivating the alarm or the tamper sensor.

2. An anti-theft alarm for device, said anti-theft alarm comprising:
   a) a first uniquely coded security element for attachment to the device,
   b) a second security element for cooperating with said first security element,
   c) an electrically operated control module connectable to the second security element and to an electrical power supply, said control module having i) a recognition sensor for recognizing cooperation of the first and second security elements, ii) a motion detector, iii) a tamper sensor for determining a condition selected from the group consisting of a first condition which consists of lack of recognition of the cooperation of the first and second security elements and a second condition which consists of disconnection of the electrical power together with movement of the control module as detected by the motion sensor, iv) an alarm which is initiated by the tamper sensor under conditions of the first or second conditions, and an arming latch to keep the alarm activated while the first or second condition persists, and v) deactivation means for deactivating the alarm or the tamper sensor.

* * * * *